(12) United States Patent
Sugita

(10) Patent No.: US 10,582,082 B2
(45) Date of Patent: Mar. 3, 2020

(54) IMAGE PROCESSING APPARATUS CAPABLE OF FACSIMILE COMMUNICATION, CONTROL METHOD OF IMAGE PROCESSING APPARATUS, AND STORAGE MEDIUM

(71) Applicant: CANON KABUSHIKI KAISHA, Tokyo (JP)

(72) Inventor: Hikaru Sugita, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/136,831

(22) Filed: Sep. 20, 2018

(65) Prior Publication Data

US 2019/0098166 A1   Mar. 28, 2019

(30) Foreign Application Priority Data

Sep. 26, 2017   (JP) ................................ 2017-184747

(51) Int. Cl.
*H04N 1/32* (2006.01)
*H04N 1/00* (2006.01)

(52) U.S. Cl.
CPC ..... *H04N 1/32085* (2013.01); *H04N 1/00413* (2013.01); *G06F 2221/2141* (2013.01); *H04N 2201/3205* (2013.01); *H04N 2201/3208* (2013.01); *H04N 2201/3273* (2013.01)

(58) Field of Classification Search
CPC ........... H04N 1/32085; H04N 1/00413; H04N 2201/3205; H04N 2201/3208; H04N 2201/3273; G06F 2221/2141
See application file for complete search history.

(56) References Cited

U.S. PATENT DOCUMENTS

2013/0125234 A1* 5/2013 Nishiyama ......... H04N 1/32048
726/21

FOREIGN PATENT DOCUMENTS

| JP | 2001-77997 A | 3/2001 |
|---|---|---|
| JP | 2013-106103 A | 5/2013 |
| JP | 2018-011174 A | 1/2018 |

* cited by examiner

*Primary Examiner* — Iriana Cruz
(74) *Attorney, Agent, or Firm* — Canon U.S.A., Inc. IP Division

(57) ABSTRACT

Registration in an address book from a transmission history which may lead to erroneous transmission is prohibited, and other address book registration and the like are enabled, so that erroneous transmission can be prevented without impairing convenience.

9 Claims, 11 Drawing Sheets

FIG.8

800 — TRANSMISSION HISTORY
- FAX  6789 0123
- FAX  5678 9012  ~801
- FAX  4567 8901
- FAX  3456 7890
- FAX  2345 6789
- FAX  1234 5678

DETAIL INFORMATION ↓

810 — DETAIL INFORMATION

| RECEIPT NUMBER | : 0001 |
|---|---|
| RESULT | : OK |
| START TIME | : 2016/03/03  16:30 |
| JOB TYPE | : FAX |
| ADDRESS | : 5678 9012 |
| NUMBER OF DOCUMENT SHEETS | : 5 |

[ REGISTER IN ADDRESS BOOK ] ~811

FAX NEW REGISTRATION SCREEN ↓

820 — FAX

| ADDRESS TYPE | : FAX |
|---|---|
| NAME | : |
| ADDRESS | : 5678 9012 |

[ LDAP SERVER ] [ TRANSMISSION HISTORY ]        [ ENTER ] — 821

IMAGE PROCESSING APPARATUS CAPABLE OF FACSIMILE COMMUNICATION, CONTROL METHOD OF IMAGE PROCESSING APPARATUS, AND STORAGE MEDIUM

BACKGROUND

Field of the Disclosure

The present disclosure relates to an image processing apparatus having a function of registering a transmission address of a transmission history in an address book, a method for controlling the image processing apparatus, and a storage medium.

Description of the Related Art

Conventional image processing apparatuses which electronic mails, facsimiles, and files include the one which can register address data of a transmission history in an address book (see Japanese Patent Application Laid-Open No. 2013-106103).

In addition, conventional image processing apparatuses include the one which registers a telephone number obtained from a called subscriber identification (CSI) signal received from a transmission destination as an address of a facsimile transmission history (see Japanese Patent Application Laid-Open No. 2001-77997). A CSI signal is a signal received from a facsimile receiving side apparatus when a facsimile is transmitted and indicates a telephone number registered in the facsimile receiving side apparatus.

However, a facsimile number obtained from the CSI signal is a facsimile number registered in a communication partner apparatus (the facsimile receiving side apparatus), and thus the facsimile number may be different from a facsimile number specified in a transmission address in some cases. In this case, if the facsimile number obtained from the CSI signal has been registered in an address of a facsimile transmission history, the address of the transmission history may be registered in an address book by a user. When a facsimile is transmitted by specifying an address using the address book registered from the transmission history in this manner, the facsimile transmission is likely to be erroneous transmission.

SUMMARY

Some embodiments are directed to an image processing apparatus, capable of performing facsimile transmission, that includes an address book registration unit configured to register an address to be used in facsimile transmission in an address book, a history storage unit configured to store a history of facsimile transmission which includes a telephone number indicated by a called subscriber identification (CSI) signal received from a transmission destination in a case where the facsimile transmission is performed, a registration unit configured to register an address included in the history in the address book, a first setting unit configured to set a first setting for prohibiting the registration unit from registering a facsimile address in the address book from the history, and a control unit configured to perform control so that the registration unit is unusable in a case where the first setting is set.

Further features of various embodiments will become apparent from the following description of exemplary embodiments with reference to the attached drawings.

BRIEF DESCRIPTION OF THE DRAWINGS

FIG. 8 illustrates an example of operation screen transition regarding address book registration from a transmission history.

DESCRIPTION OF THE EMBODIMENTS

Various exemplary embodiments will be described below with reference to the attached drawings. According to some exemplary embodiments, a multifunction peripheral (MFP) having print, scan, and facsimile (FAX) functions is described as an example of an image processing apparatus. The exemplary embodiments which will be described below do not restrict all embodiments, and all the combinations of the features described in the exemplary embodiments are not always essential to all embodiments.

Figure 1:
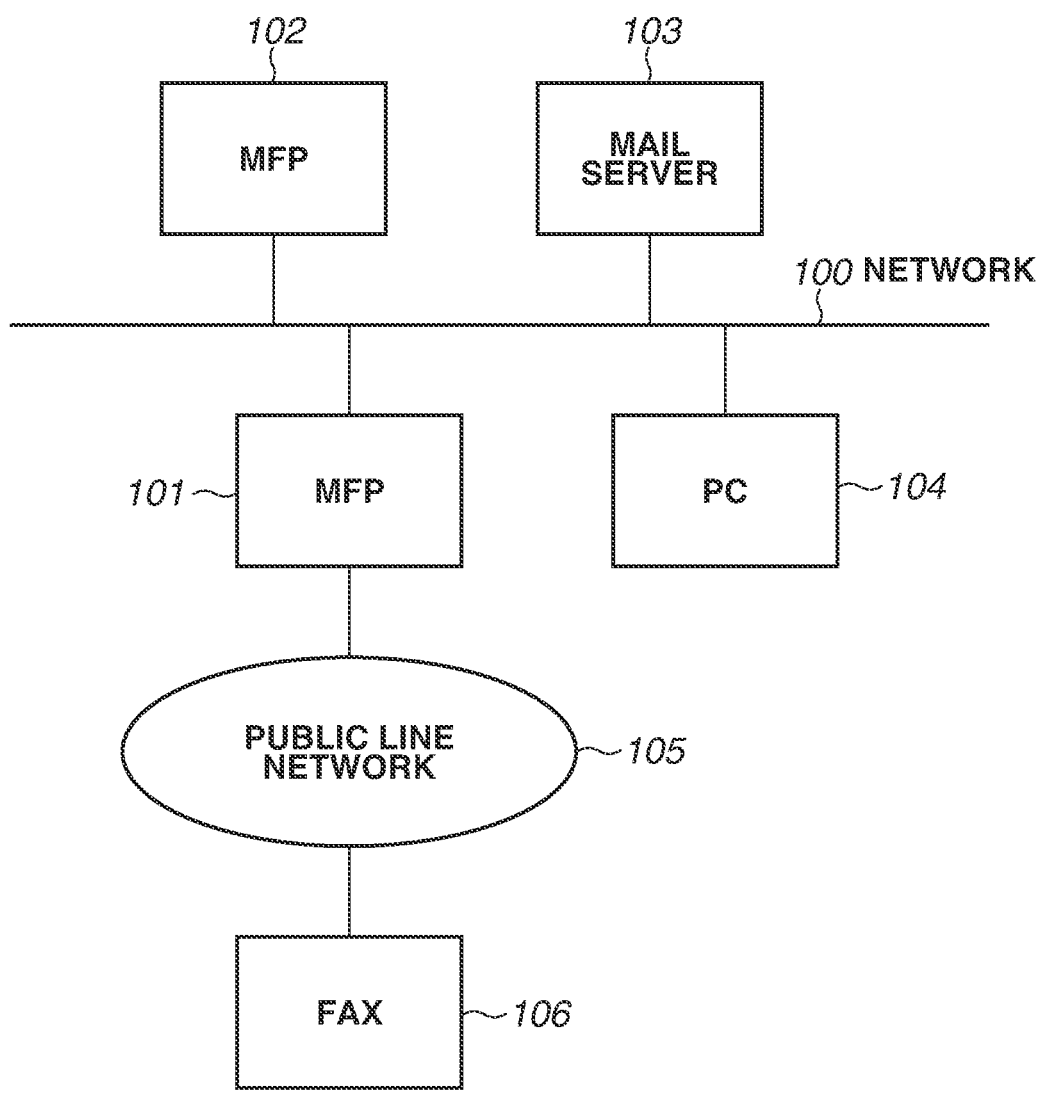
FIG. 1 illustrates an example of a network configuration including an image processing apparatus according to an exemplary embodiment.

FIG. 1 is a block diagram illustrating an example of a network configuration including an image processing apparatus according to a first exemplary embodiment. As illustrated in FIG. 1, an MFP 101, an MFP 102, a mail server 103, and a personal computer (PC) 104 are connected to a network 100 in a mutually communicable manner. The network 100 may be a local area network or the Internet. The MFP 101 and a FAX 106 are connected to a public line network 105 in a mutually communicable manner. FIG. 1 illustrates the MFP 101 as an example of the image processing apparatus transmission apparatus) according to the present exemplary embodiment and the PC 104, the MFP 102, and the FAX 106 as examples of job transmission destination apparatuses (reception apparatuses).

The MFP 101 is a multifunction peripheral functioning as the image processing apparatus according to the present exemplary embodiment. The PC 104 is an information processing apparatus, such as a personal computer. The FAX 106 is a facsimile apparatus.

When transmitting scanned image data to the MFP 102 or PC 104 as an electronic mail, the MFP 101 specifies an electronic mail address of the MFP 102 or the PC 104 as a transmission address and transmits the electronic mail to the mail server 103. The mail server 103 stores the received electronic mail in a mail box provided in a storage (not illustrated) as an electronic mail to be received by the MFP 102 or the PC 104. The MFP 102 or the PC 104 receives the electronic mail transmitted from the MFP 101 from the mail box of the mail server 103 using an electronic mail reception account set from the mail box of the mail server 103.

When transmitting scanned image data as a facsimile to the FAX 106, the MFP 101 specifies a telephone number of the FAX 106 as a transmission address and transmits the facsimile to the FAX 106.

The MFP 101 is arranged on a network configuration in which an electronic mail address and a FAX number can be specified as a transmission address. The MFP 101 can use all networks, such as a configuration wirelessly connected to an access point (not illustrated), as effective communication units as long as a network configuration can perform data transmission.

Figure 2:
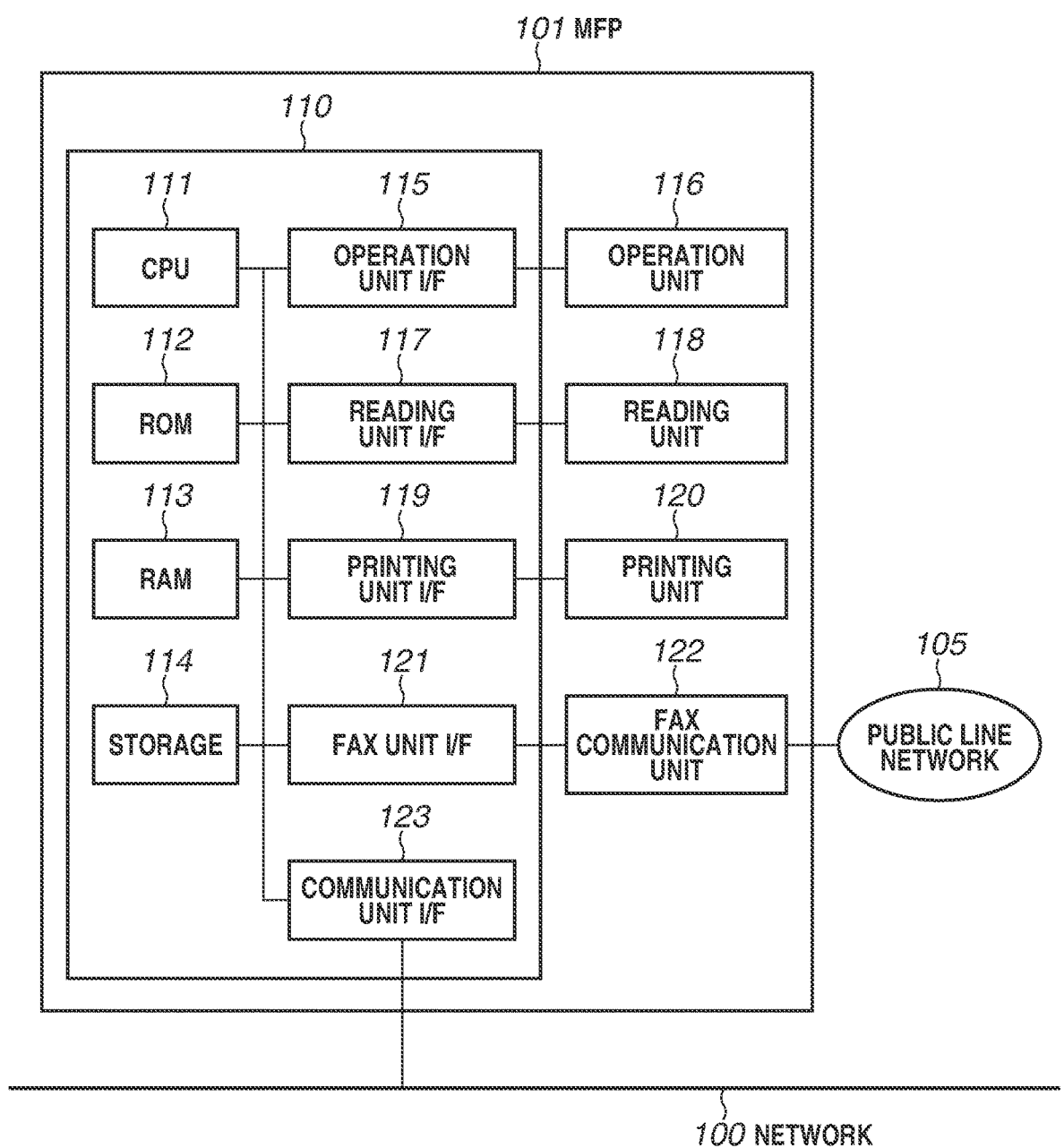
FIG. 2 illustrates an example of a hardware configuration of the image processing apparatus according to the present exemplary embodiment.

FIG. 2 is a block diagram illustrating an example of a hardware configuration of the MFP 101 as the image processing apparatus according to the present exemplary embodiment.

As illustrated in FIG. 2, a control unit 110, including a central processing unit (CPU) 111, entirely controls operations of the MFP 101. The CPU 111 reads a control program stored in a read-only memory (ROM) 112 or a storage 114 and performs various types of control, such as reading control and printing control. The ROM 112 stores a control program which can be executed by the CPU 111. The ROM 112 further stores a boot program, font data, and the like. A random access memory (RAM) 113 is a main storage memory of the CPU 111 and is used as a work area and a temporary storage area for developing various control programs stored in the ROM 112 and the storage 114.

The storage 114 stores image data, print data, various programs, and various setting information pieces. According to the present exemplary embodiment, a flash memory is assumed as the storage 114, however, an auxiliary storage device such as a solid state drive (SSD), a hard disk drive (HDD), and an embedded multimedia card (eMMC) may be used.

In the embodiment of the MFP 101 illustrated in FIG. 2, the single CPU 111 executes each processing illustrated in flowcharts described below using the single memory (the RAM 113); however, another mode may be used. For example, each processing illustrated in the flowcharts described below can be executed in cooperation with a plurality of CPUs, RAMs, ROMs, and storages. A part of the processing may be executed using a hardware circuit, such as an application specific integrated circuit (ASIC) and a field programmable gate array (FPGA).

An operation unit interface (I/F) 115 connects an operation unit 116 to the control unit 110. The operation unit 116 displays information to a user and detects an input from a user.

A reading unit I/F 117 connects a reading it 118 to the control unit 110. The reading unit 118 reads an image on a document and converts the image into image data, such as binary data. The image data generated by the reading unit 118 may be transmitted to an external apparatus and printed on a recording sheet.

A printing unit I/F 119 connects a printing unit 120 to the control unit 110. The CPU 111 transfers image data to be printed (print target image data) to the printing unit 120 via the printing unit I/F 119. The printing unit 120 prints an image on a recording sheet fed from a sheet feeding cassette.

The control unit 110 is connected to the network 100 via a communication unit I/F 123. The communication unit I/F 123 transmits image data and various information pieces in the apparatus to an external apparatus on the network 100 and receives print data and various information pieces on the network 100 from an information processing apparatus on the network 100. As a transmission and reception method via a network, transmission and reception using the above-described electronic mail, file transmission using other protocols (for example, a file transfer protocol (FTP), a Server Message Block (SMB), and Web-based distributed authoring and versioning (WEBDAV)) can be performed. Further, the control unit 110 can have a WEB server function and display a received job history and various setting data pieces on the PC 104 by an access from the PC 104 using a HyperText Transfer Protocol (HTTP) protocol.

The control unit 110 is connected to the public line network 105 by causing a FAX unit I/F 121 to control a FAX communication unit 122. The FAX unit I/F 121 is an I/F for controlling the FAX communication unit 122 and can perform connection to the public line network and control of a facsimile communication protocol by controlling a facsimile communication modem and a network control unit (NCU).

Figure 3:
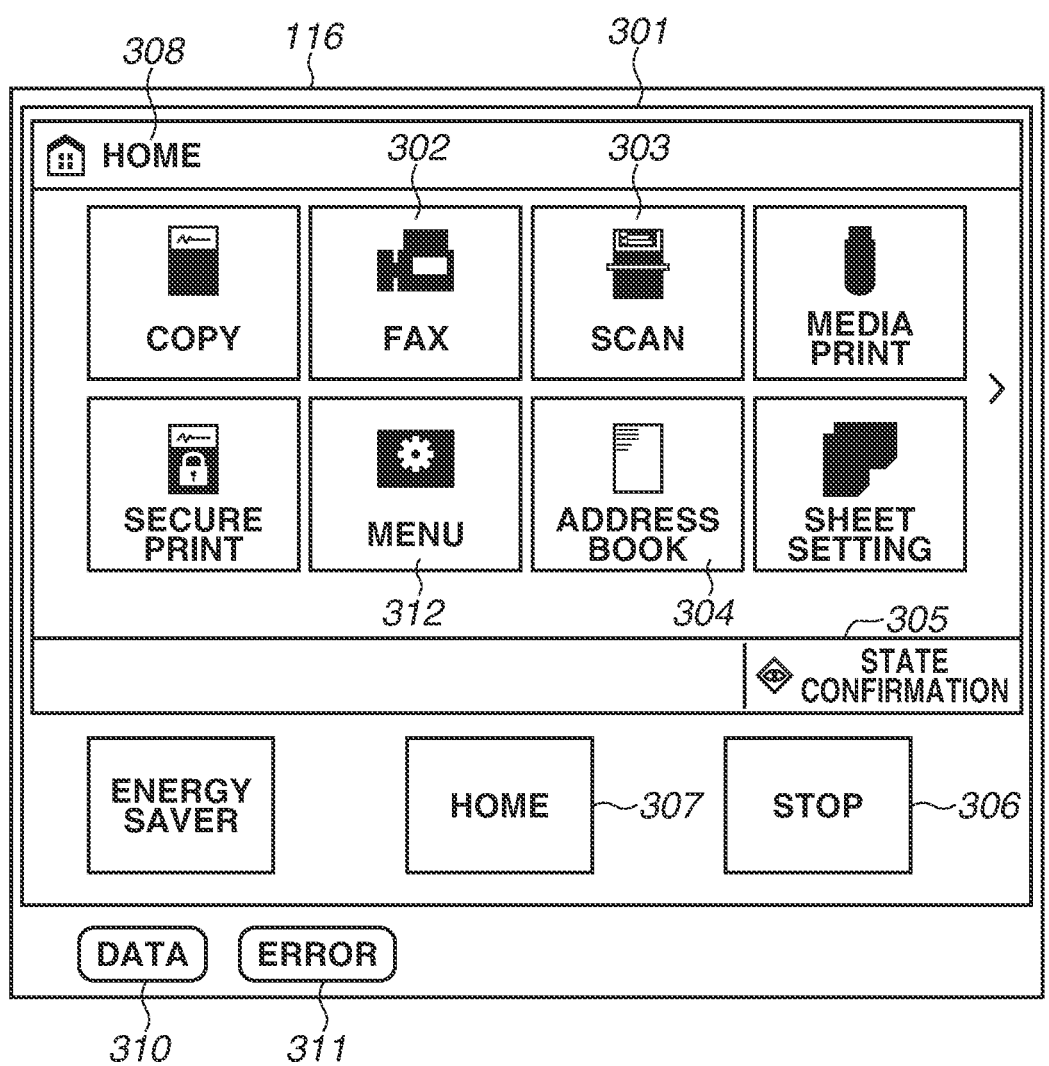
FIG. 3 illustrates an example of a configuration of an operation unit.

FIG. 3 is an outline view of an example of a configuration of the operation unit 116.

As illustrated in FIG. 3, the operation unit 116 includes a touch panel 301 for displaying an operation screen and light-emitting diodes (LED) 310 and 311.

The touch panel 301 also functions as a unit for receiving an instruction from a user as a touch panel. A user may directly touch a screen displayed on the touch panel 301 with a user's finger and with an object such as a stylus and may instruct execution of each function based on a displayed screen.

FIG. 3 illustrates an example when the touch panel 301 displays a home screen 308. The home screen 308 is an initial screen for a user to instruct execution of each function of the MFP 101 and a screen for a user to select screen display for performing various settings of each function executed by the MFP 101, such as copy, FAX, scan, and media print.

In the home screen 308, a state confirmation button 305 is a button for displaying a screen for confirming a state of the MFP 101 (a state confirmation screen). A transmission history can be displayed via the state confirmation screen.

In this regard, it is described as a button in the present exemplary embodiment, however, a button on a touch panel represents detecting of pressing when a region divided in a display area is touched.

A FAX button 302 is a button for displaying a facsimile transmission screen (not illustrated) of the MFP 101. On the MFP 101, a user can input a telephone number using the facsimile transmission screen or specify an address from an address book and transmit image data read by the reading unit 118 as a facsimile (FAX) to a communication paltrier.

A scan button 303 is a button for displaying a scan selection screen (not illustrated) from the MFP 101. The scan selection screen displays a selection display screen for selecting a unit which performs electronic mail transmission E-mail), file transmission by SMB and FTP, Internet FAX (I-FAX) transmission, or the like. A user touches the displayed selection display screen, and thus each transmission setting screen can be displayed.

An address book button 304 is a button for displaying an address book screen 400 (FIG. 4) of the MFP 101. The address book screen 400 is described below with reference to FIG. 4.

A menu button 312 is a button for displaying a screen for performing an environmental setting, such as a language to be used, and a setting of each function.

A stop button 306 is a button to be pressed to execute cancellation of various operations. A home button 307 is a button to be pressed to display the home screen 308. The stop button 306 and the home button 307 are resident buttons always displayed on the operation unit 116.

The LEDs 310 and 311 notify a user of a state of the MFP 101. The LED 310 is lit during reception and execution of an electronic mail and a print Job. The LED 311 is lit when some error occurs in the MFP 101.

Figure 4:
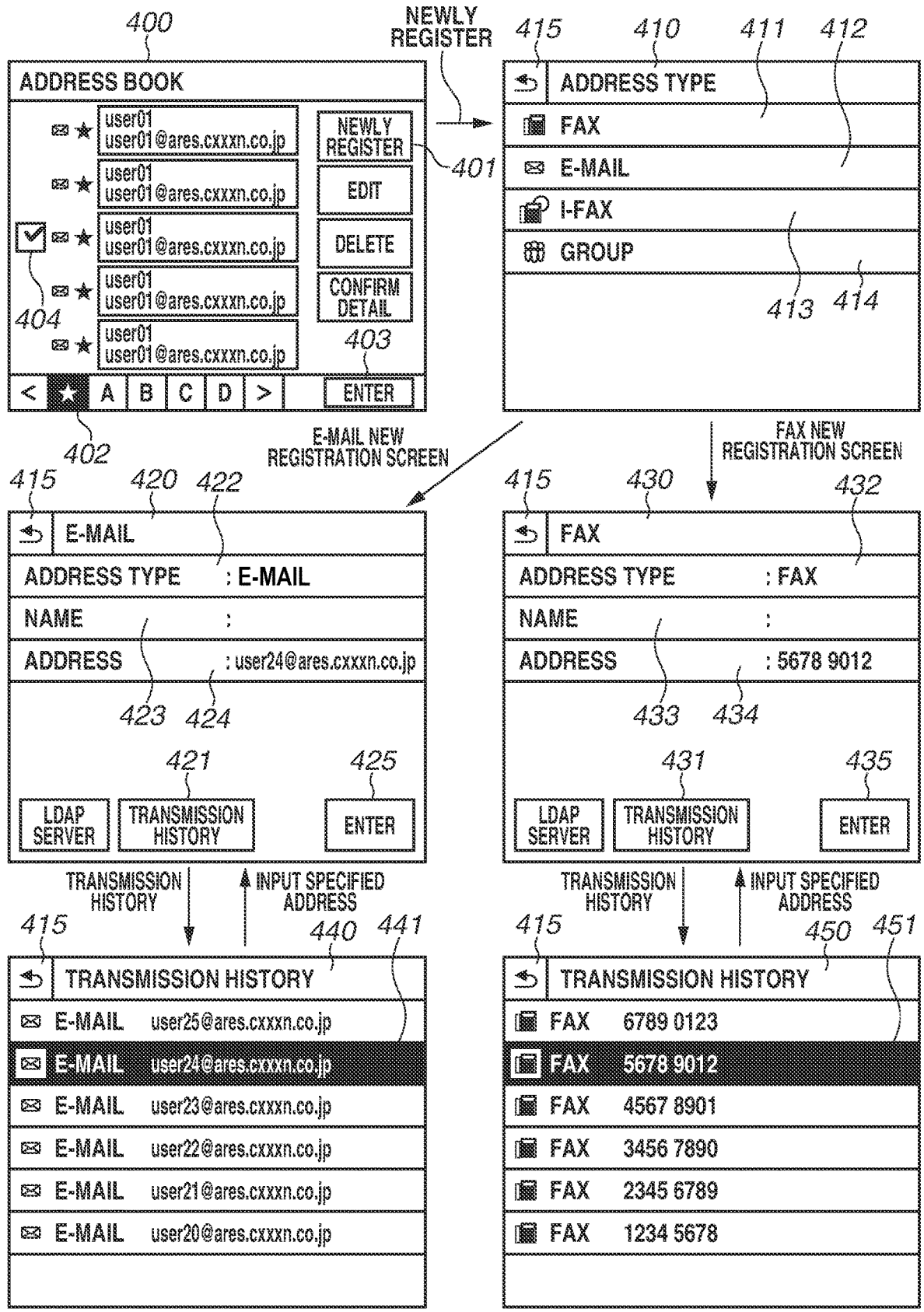
FIG. 4 illustrates an example of operation screen transition regarding address book registration.

FIG. 4 illustrates an example of transition of operation screens regarding address book registration. In FIG. 4, display of the resident buttons, such as the stop button 306 and the home button 307, is omitted. The screen transition illustrated in FIG. 4 is realized by control by the CPU 111 based on a program stored in the ROM 112 and the like.

The address book screen 400 is displayed on the touch panel 301 when the address book button 304 on the home screen 308 is pressed. On the address book screen 400, address data registered in the address book is displayed in a list, and the address data can be scrolled and displayed by dragging the screen. In the address book, an address to be used for facsimile transmission and E-mail transmission can be registered, and the data in the address book is stored in, for example, an address book storage area of the storage 114.

A black star mark 402 and a button of "A", "B", "C", or "D" in a lower part of the address book screen 400 is pressed, and thus the address data pieces in the address book are filtered based on whether a first character of an address name is "A", "B", "C", or "D" and displayed. When the black star mark 402 is pressed, all of the address data pieces are displayed. When a user touches and selects the address data (a check mark 404 is displayed), and then presses an enter button 403, the screen is shifted to a transmission screen (not illustrated) in which the selected address data is set.

In the address book screen 400, a new registration button 401 is a button for shifting to a screen (an address type screen 410) for newly registering the address data in the address book.

The address type screen 410 is displayed when a user touches the new registration button 401 on the address book screen 400. The address type screen 410 is a selection screen of a FAX 411, an E-mail 412, an I-FAX 413, and a group 414.

When the FAX 411 is pressed, a FAX new registration screen 430 for newly registering the address data for facsimile transmission in the address book is displayed.

When the E-mail 412 is pressed, an E-mail new registration screen 420 for newly registering the address data for electronic mail transmission in the address book is displayed.

When the I-FAX 413 is pressed, an I-FAX new registration screen (not illustrated) for newly registering the address data for Internet facsimile transmission in the address book is displayed. When the group 414 is pressed, a multi-address transmission registration screen (not illustrated) for performing multi-address transmission is displayed.

A return display 415 is a display for returning to a previous screen after a screen transition. When the return display 415 is pressed on the address type screen 410, the screen display is returned to the address book screen 400 as the previous screen. Similarly, the return display 415 is arranged on each of screens 420, 430, 440, and 450 and enables the display to return to the previous screen.

In the E-mail new registration screen 420, an address type 422 is an E-mail, and a name 423, an address 424, and various buttons (421, 425, and others) are displayed. When each button is pressed on the E-mail new registration screen 420, an input screen corresponding to the pressed button is displayed. According to the present exemplary embodiment, a transmission history button 421 for referring to an E-mail transmission history screen 440 is displayed on the E-mail new registration screen 420, so that an address of the E-mail transmission history can be referred to during new address registration.

When a user selects a history to be set to a new address on the E-mail transmission history screen 440, the selected history is reversely displayed as shown in a transmission history address 441. When the return display 415 is pressed in this state, the display returns to the E-mail new registration screen 420, and an electronic mail address as an address of the selected history is set to the address 424. Subsequently, when an enter button 425 is pressed on the E-mail new registration screen 420, the electronic mail address set to the address 424 is fixed as the address of the electronic mail and registered in the address book.

In the FAX new registration screen 430, an address type 432 is FAX, and a name 433, an address 434, and various buttons (431, 435, and others) are displayed. When each button is pressed on the FAX new registration screen 430, an input screen corresponding to the pressed button is displayed. According to the present exemplary embodiment, a transmission history button 431 for referring to a FAX transmission history screen 450 is displayed on the FAX new registration screen 430, so that an address of the FAX transmission history can be referred to during new address registration.

When a user selects a history to be set to a new address on the FAX transmission history screen 450, the selected history is reversely displayed as shown in a transmission history address 451. When the return display 415 is pressed in this state, the display returns to the FAX new registration screen 430, and a FAX number of the selected address is set to the address 434. Subsequently, when an enter button 435 is pressed on the FAX new registration screen 430, the FAX number set to the address 434 is fixed as the address of facsimile transmission and registered in the address book.

History information pieces displayed on the E-mail transmission history screen 440 and the FAX transmission history screen 450 are stored in, for example, a history storage area of the storage 114. The MFP 101 can store a history of the facsimile transmission including a telephone number indicated by a CSI signal received from a transmission destination when facsimile transmission is performed as an address. In other words, the history information pieces may include the one including the telephone number indicated by the CSI signal as the address.

Figure 5:
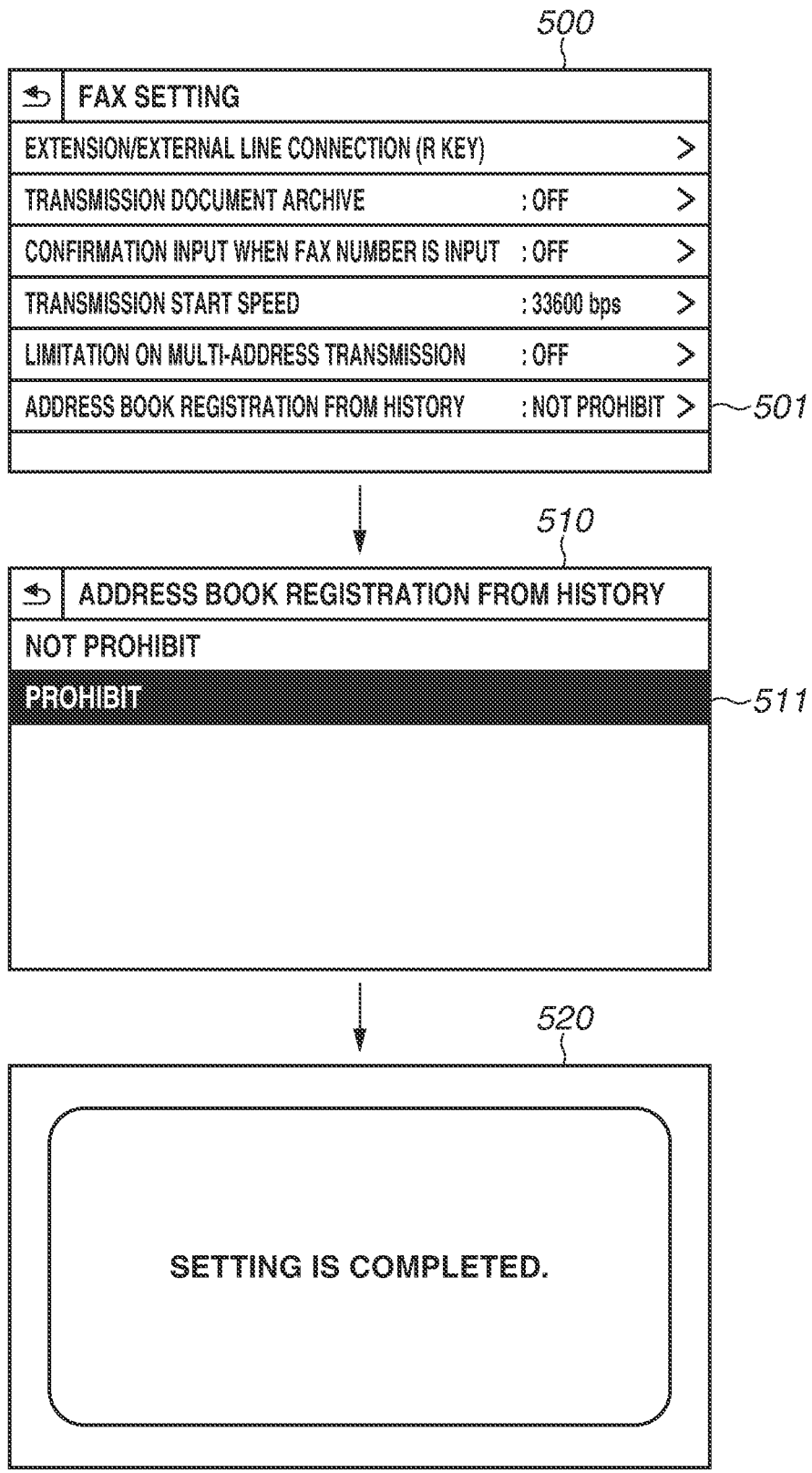
FIG. 5 illustrates an example of operation screen transition of a setting for prohibiting address book registration from a transmission history.

FIG. 5 illustrates an example of operation screen transition regarding a setting for prohibiting address book registration from the transmission history. In FIG. 5, the resident buttons, such as the stop button 306 and the home button 307, are omitted from the display. The screen transition illustrated in FIG. 5 is realized by control by the CPU 111 based on a program stored in the ROM 112 and the like.

A FAX setting screen 500 is an example of a screen which can be shifted thereto by the menu button 312 on the home screen 308. For example, the FAX setting screen 500 is displayed on the touch panel 301 when a setting regarding a FAX is selected on a screen displayed by the menu button 312. In the FAX setting screen 500, a list of FAX setting items is displayed. A user selects a desired item from the list and thus can change a setting of the item.

For example, when a user select an address book registration button 501 from the history on the FAX setting screen 500, the screen is shifted to an address book registration setting change screen 510 from the history.

In the address book registration setting change screen 510, a user can select to "prohibit" or "not prohibit" the address book registration from the history. The setting selected by a touch is reversely displayed as shown in a column 511, and then the setting is changed by displaying a setting completion screen 520. Subsequently, the screen returns to the FAX setting screen 500. The settings are stored in, for example, the storage 114 by control by the CPU 111.

Figure 6:
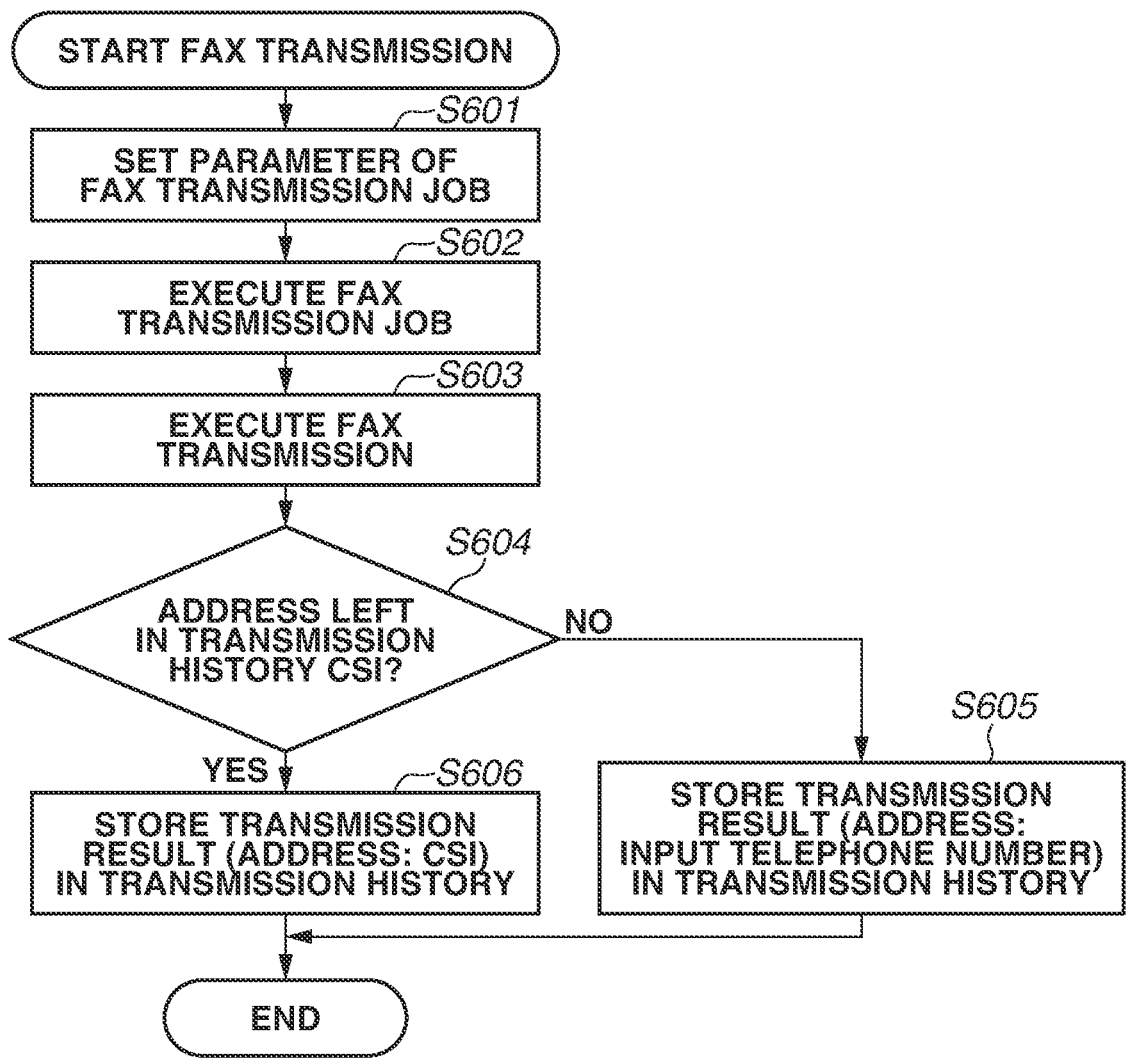
FIG. 6 is a flowchart illustrating facsimile (FAX) transmission control processing according to the present exemplary embodiment.

FIG. 6 is a flowchart illustrating an example of processing regarding FAX transmission control by the image processing apparatus according to the present exemplary embodiment. In this embodiment, each operation in the flowchart illustrated in FIG. 6 is realized by the CPU 111 reading a control program stored in the RUM 112 or the storage 114 to the RAM 113 and executing it.

In S601, the CPU 111 receives settings of parameters necessary for FAX transmission, such as a telephone number of a communication partner and resolution of a transmission image by a user via the operation unit 116, and advances the processing to S602 when a start of a FAX transmission job is instructed.

In S602, the CPU 111 starts to execute the FAX transmission job based on the parameters set in the above-described S601.

Next, in S603, the CPU 111 executes facsimile transmission. The CPU 111 calls an apparatus to be a transmission destination (a receiving apparatus), performs communication for negotiating a transmission speed and a function (including reception of a CSI signal), and then transmits an image signal.

Next, in S604, the CPU 111 determines whether an address to be left in a FAX transmission history is set to CSI. Whether to set an address to be left in the FAX transmission history to the telephone number of the communication partner indicated by the CSI signal or to the telephone number of the communication partner actually transmitted may be performed by a service person in a service mode, which is not illustrated. The setting is stored, for example, in the storage 114. The setting is not limited to a setting in the service mode and may be an item which can be set by a normal user.

In the above-described S604, in a case where the CPU 111 determines that the address to be left in the FAX transmission history is not set to the CSI (NO in S604), the CPU 111 advances the processing to S605.

Next, in S605, the CPU 111 stores a result of the facsimile transmission executed in the above-described S603 (the address is the telephone number of the communication partner input in S601) in the transmission history (for example, a transmission history storage area in the storage 114) and terminates the processing in the present flowchart.

On the other hand, in the above-described S604, in a case where the CPU 111 determines that the address to be left in the FAX transmission history is set to the CSI (YES in S604), the CPU 111 advances the processing to S606.

Next, in S606, the CPU 111 stores the result of the facsimile transmission executed in the above-described S603 (the address is the telephone number of the communication partner indicated by the CSI signal) in the transmission history (for example, the transmission history storage area in the storage 114) and terminates the processing in the present flowchart. When the telephone number is not registered in the receiving apparatus, the telephone number of the communication partner input in S601 may be registered in the history.

Figure 7:
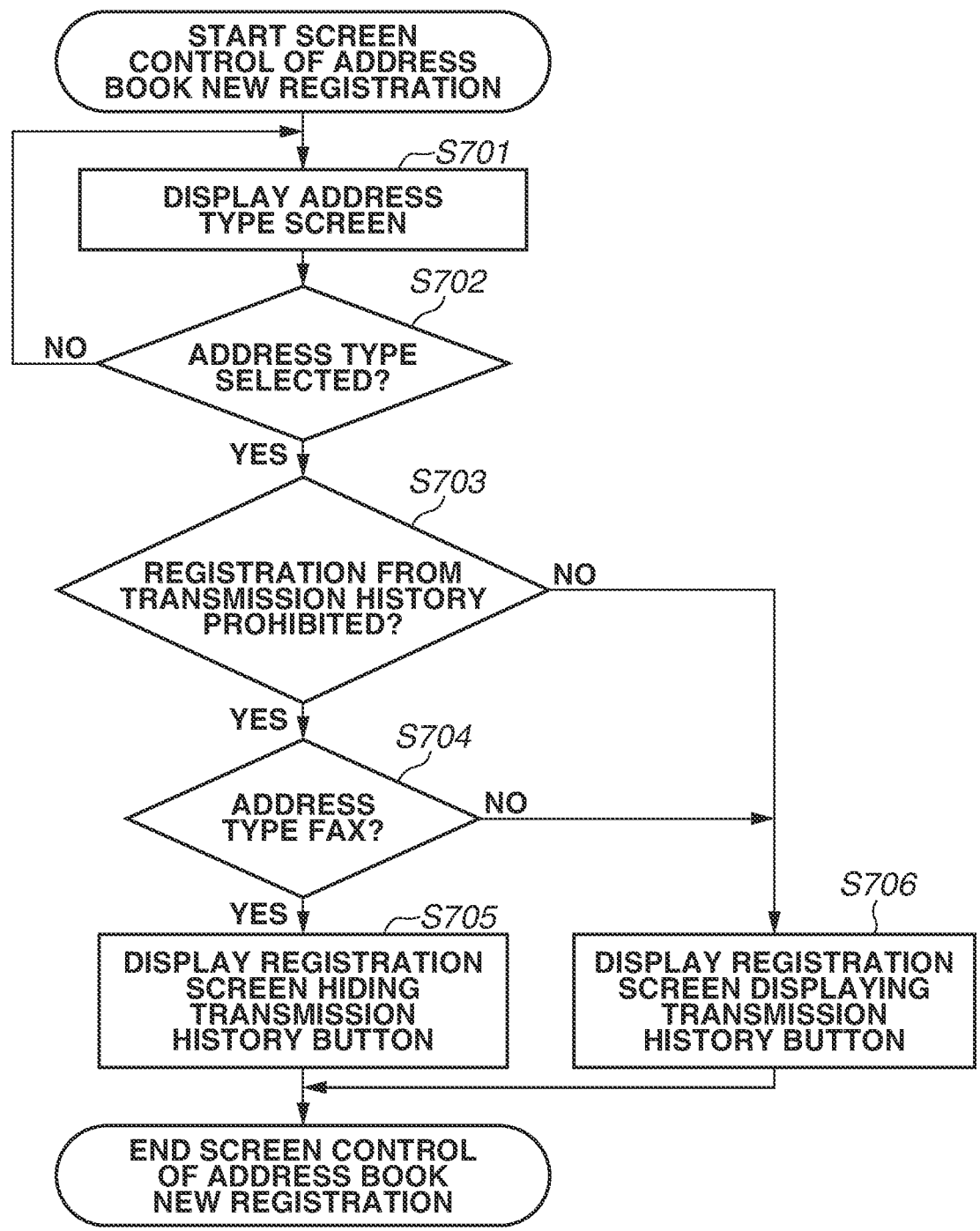
FIG. 7 is a flowchart illustrating screen control processing on new registration of an address book according to a first exemplary embodiment.

FIG. 7 is a flowchart illustrating an example of processing regarding screen control on new registration of an address book by the image processing apparatus according to the first exemplary embodiment. Each operation in the flowchart illustrated in FIG. 7 may be realized by the CPU 111 reading a control program stored in the ROM 112 or the storage 114 to the RAM 113 and executing it. When detecting pressing of the new registration button 401 on the address book screen 400 which is displayed by pressing of the address book button 304 on the home screen 308 of the operation unit 116, the CPU 111 executes control corresponding to the processing in the flowchart illustrated in FIG. 7.

In S701, the CPU 111 displays the address type screen 410 on the touch panel 301.

In S702, the CPU 111 determines whether the address type is selected on the address type screen 410. The determination is performed based on detection of pressing of the FAX 411, the E-mail 412, the I-FAX 413, or the group 414 displayed on the address type screen 410.

In the above-described S702, when pressing of the FAX 411, the E-mail 412, the I-FAX 413, or the group 414 displayed on the address type screen 410 is not detected, the CPU 111 determines that the address type is not selected (NO in S702) and returns the processing to S701.

On the other hand, when pressing of the FAX 411, the E-mail 412, the I-FAX 413, or the group 414 displayed on the address type screen 410 is detected, the CPU 111 determines that the address type is selected (YES in S702) and advances the processing to S703.

In S703, the CPU 111 determines whether address book registration from the transmission history is prohibited. In a case where the CPU 111 determines that the address book registration from the transmission history is not prohibited (NO in S703), the CPU 111 advances the processing to S706. The processing in S706 is described below.

On the other hand, in the above-described S703, in a case where the CPU 111 determines that the address book registration from the transmission history is prohibited (YES in S703), the CPU 111 advances the processing to S704.

In S704, the CPU 111 determines whether the address type selected in the above-described S702 is a facsimile (the FAX 411). In a case where the CPU 111 determines that the address type selected in the above-described S702 is not the facsimile (the FAX 411) (NO in S704), the CPU 111 determines that an erroneous facsimile number due to the CSI signal is not likely to be registered in the address book and advances the processing to S706.

In S706, the CPU 111 displays a new address registration screen for the address type selected in the above-described S702 on the touch panel 301 in a state in which the transmission history buttons (the buttons 421 and 431 in FIG. 4) are included (in an available form) in the screen and terminates the processing in the present flowchart. More specifically, registration of the address in the address book from the transmission history is not prohibited in this case.

In the above-described S704, in a case where the CPU 111 determines that the address type selected in the above-described S702 is the facsimile (the FAX 411) (YES in S704), the CPU 111 determines that an erroneous facsimile number due to the CSI signal is likely to be registered in the address book and advances the processing to S705.

In S705, the CPU 111 displays a new address registration screen for the address type selected in the above-described S702 on the touch panel 301 in a state in which the transmission history buttons (the buttons 421 and 431 in FIG. 4) are not included (in an unavailable form) in the screen and terminates the processing in the present flowchart. More specifically, the registration of the facsimile address in the address book from the transmission history is prohibited in this case.

FIG. 8 illustrates an example of transition of operation screens regarding the address book registration from the transmission history. The screen transition illustrated in FIG. 8 may be realized by control by the CPU 111 based on a program stored in the ROM 112 and the like.

A transmission history screen 800 is an example of a transmission history screen which can be shifted from the state confirmation screen (not illustrated) displayed by pressing of the state confirmation button 305 on the home screen 308 of the operation unit 116. In the transmission history screen 800, transmitted history data is displayed in a list, and the history data can be scrolled and displayed by dragging the screen. Further, a history touched by a user is reversely displayed as shown in a history 801, and the screen is shifted from the transmission history screen 800 to a detail information screen 810.

The detail information screen 810 displays detail information pieces of the transmission history, such as "transmission result", "start time", "communication time", and "address". When an address book registration button 811 is pressed, the detail information screen 810 is shifted to a FAX new address registration screen 820 in which the address of the detail information displayed in the detail information screen 810 is reflected in an address. When an enter button 821 is pressed on the FAX new address registration screen 820, the address in the transmission history can be registered in the address book.

Figure 9:
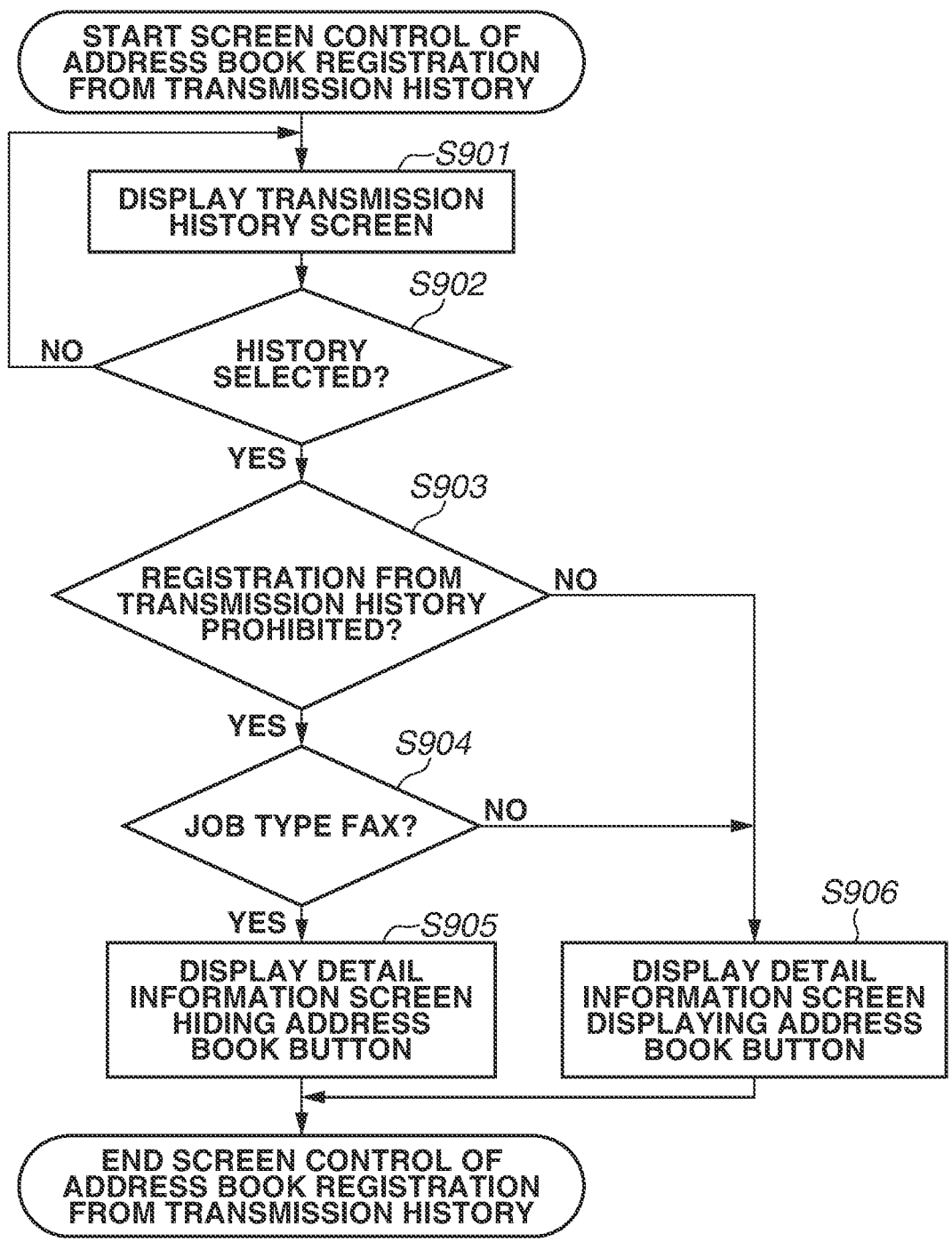
FIG. 9 is a flowchart illustrating screen control processing on address book registration from a transmission history according to the first exemplary embodiment.

FIG. 9 is a flowchart illustrating an example of processing regarding screen control on the address book registration from the transmission history by the image processing apparatus according to the first exemplary embodiment. Each operation in the flowchart illustrated in FIG. 9 may be realized by the CPU 111 reading a control program stored in the ROM 112 or the storage 114 to the RAM 113 and executing it. The CPU 111 executes the control corresponding to the processing in the flowchart illustrated in FIG. 9 when display of the transmission history is instructed from the state confirmation screen (not illustrated) displayed by pressing of the state confirmation button 305 on the home screen 308 of the operation unit 116.

In S901, the CPU 111 displays the transmission history screen 800 on the touch panel 301.

In S902, the CPU 111 determines whether any of the histories displayed on the transmission history screen 800 is touched. In a case where the CPU 111 determines that none of the histories displayed on the transmission history screen 800 are touched (NO in S902), the CPU 111 returns the processing to S901.

In the above-described S902, in a case where the CPU 111 determines that any of the histories displayed on the transmission history screen 800 is touched (YES in S902), the CPU 111 advances the processing to S903.

In S903, the CPU 111 determines whether registration from the transmission history is prohibited. In a case where the CPU 111 determines that the registration from the transmission history is not prohibited (NO in S903), the CPU 111 advances the processing to S906. The processing in S906 is described below.

In the above-described S903, in a case where the CPU 111 determines that the registration from the transmission history is prohibited (YES in S903), the CPU 111 advances the processing to S904.

In S904, the CPU 111 determines whether a type of the history selected in the above-described S902 is the facsimile. In a case where the CPU 111 determines that the type of the history selected in the above-described S902 is not the facsimile (NO in S904), the CPU 111 advances the processing to S906.

In S906, the CPU 111 displays the detail information screen 810 of the history selected in the above-described S902 on the touch panel 301 in a state in which the address book registration button 811 is included (in an available form) therein and terminates the processing in the present flowchart. More specifically, the registration of the address in the address book from the transmission history is not prohibited in this case.

On the other hand, in the above-described S904, in a case where the CPU 111 determines that the type of the history selected in the above-described S902 is the facsimile (YES in S904), the CPU 111 advances the processing to S905.

In S905, the CPU 111 displays the detail information screen 810 of the history selected in the above-described S902 on the touch panel 301 in a state in which the address book registration button 811 is not included (in an unavailable form) therein and terminates the processing in the present flowchart. More specifically, the registration of the facsimile address in the address book from the transmission history is prohibited in this case.

As described above, the first exemplary embodiment is configured to prohibit registration of the facsimile number from the transmission history in the address book. More specifically, if registration in the address book from the transmission history is set to be prohibited when a user intends to register a facsimile number in the address book on an address book registration screen, the transmission history button is not displayed on the address book registration screen. Further, if the registration in the address book from the transmission history is set to be prohibited when a user intends to register a facsimile number in the address book from the facsimile transmission history on the history screen, the address book button is not displayed on the facsimile transmission history screen. According to the above-described configuration, a facsimile number indicated by the CSI, which may be wrong, can be surely prohibited from being registered in the address book from the transmission history. On the other hand, when the address type is other than the facsimile, for example, an electronic mail address is to be registered in the address book, it is configured not to prohibit the registration of the address in the address book. Therefore, registration in the address book from the transmission history which may lead to erroneous transmission is prohibited, and other address book registration and editing are enabled, so that erroneous transmission can be prevented without impairing convenience.

Figure 10:
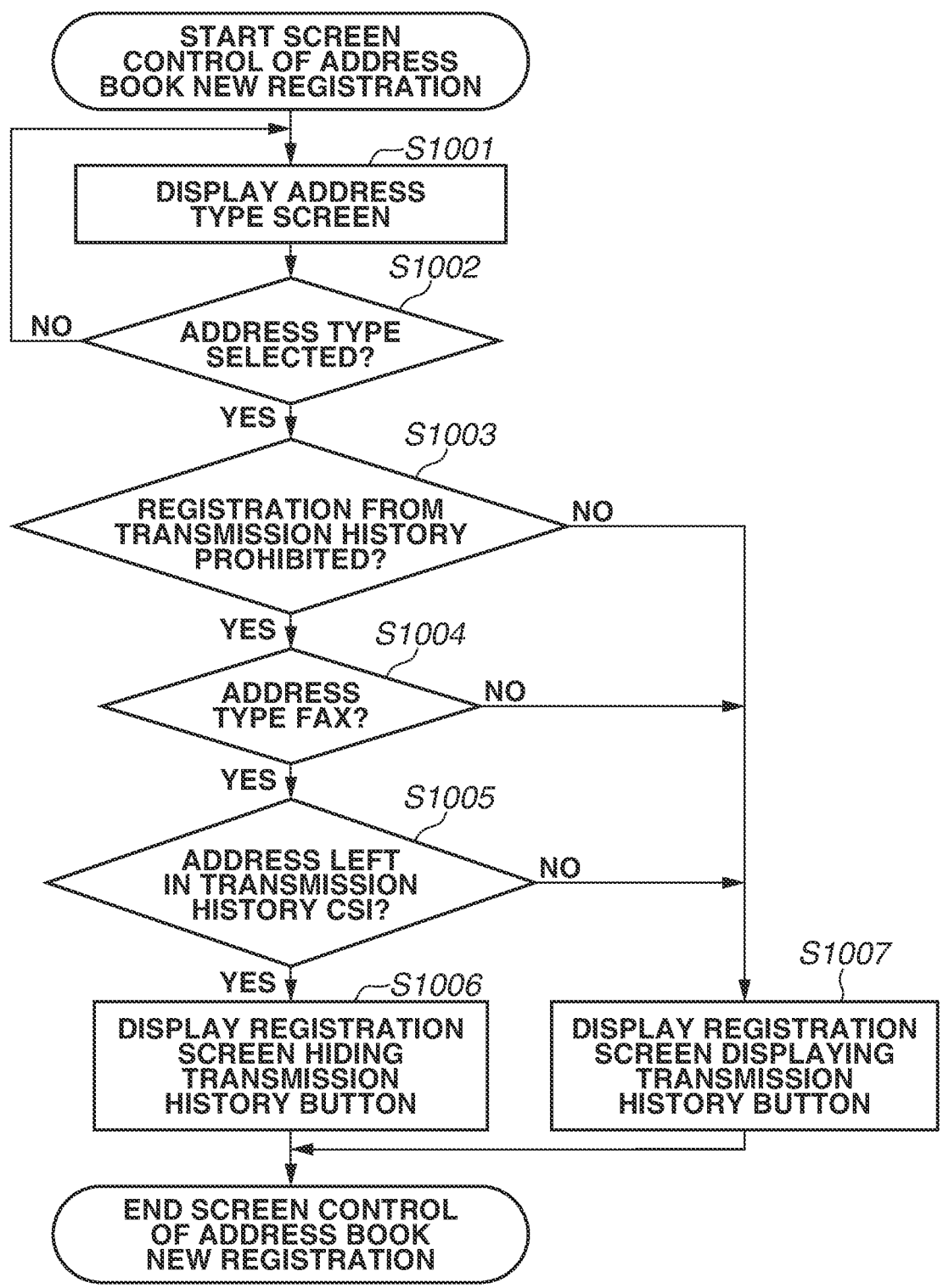
FIG. 10 is a flowchart illustrating screen control processing on new registration of an address book according to a second exemplary embodiment.

FIG. 10 is a flowchart illustrating an example of processing regarding screen control on new registration of an address book by an image processing apparatus according to a second exemplary embodiment. Each operation in the flowchart illustrated in FIG. 10 may be realized by the CPU 111 reading a control program stored in the ROM 112 or the storage 114 to the RAM 113 and executing it. When detecting pressing of the new registration button 401 on the address book screen 400 which is displayed by pressing of the address book button 304 on the home screen 308 of the operation unit 116, the CPU 111 executes control corresponding to processing in the flowchart illustrated in FIG. 10.

Processing in S1001 to S1004 is the same as the processing in S701 to S704 in FIG. 7, and thus the descriptions thereof are omitted. In FIG. 10, in a case where the CPU 111 determines that the selected address type is the facsimile (the FAX 411) (YES in S1004), the CPU 111 advances the processing to S1005.

In S1005, the CPU 111 determines whether the address to be left in the FAX transmission history is set to the CSI. In a case where the CPU 111 determines that the address to be left in the FAX transmission history is set to the CSI (YES in S1005), the CPU 111 advances the processing to S1006. Processing in S1006 is the same as the processing in S705 in FIG. 7, and thus the description thereof is omitted. In this case, registration of the facsimile address obtained from the CSI signal in the address book from the transmission history is prohibited.

On the other hand, in the above-described S1005, in a case where the CPU 111 determines that the address to be left in the FAX transmission history is not set to the CSI (NO in S1005), the CPU 111 advances the processing to S1007. Processing in S1007 is the same as the processing in S706 in FIG. 7, and thus the description thereof is omitted. In this case, the registration of the address in the address book from the transmission history is not prohibited.

Figure 11:
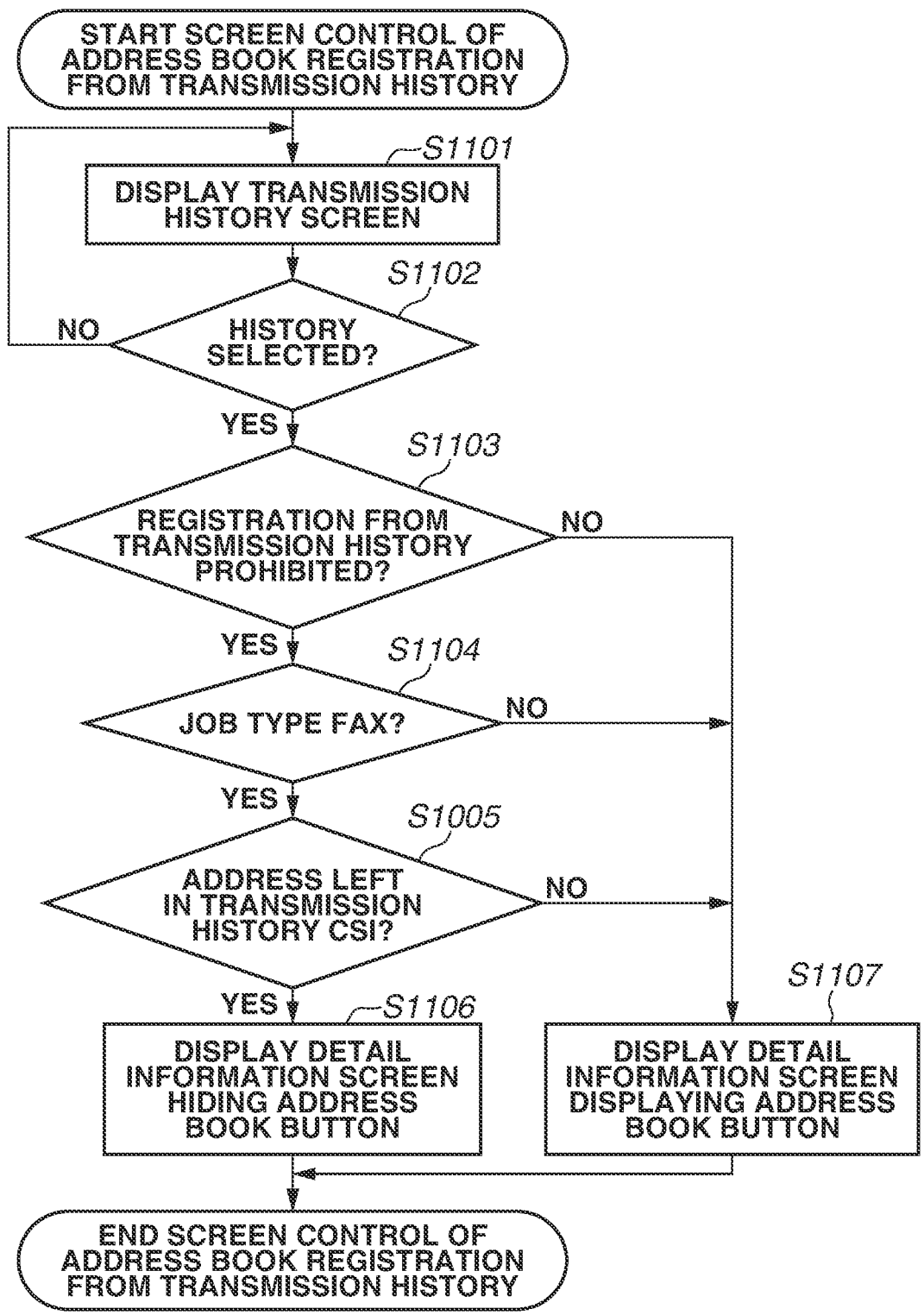
FIG. 11 is a flowchart illustrating screen control processing on address book registration from a transmission history according to the second exemplary embodiment.

FIG. 11 is a flowchart illustrating an example of processing regarding screen control on the address book registration from the transmission history by the image processing apparatus according to the second exemplary embodiment. Each operation in the flowchart illustrated in FIG. 11 may be realized by the CPU 111 reading a control program stored in the ROM 112 or the storage 114 to the RAM 113 and executing it. The CPU 111 executes the control corresponding to the processing in the flowchart illustrated in FIG. 11 when display of the transmission history is instructed from the state confirmation screen (not illustrated) displayed by pressing of the state confirmation button. 305 on the home screen 308 of the operation unit 116.

Processing in S1101 to S1104 is the same as the processing in S901 to S904 in FIG. 9, and thus the descriptions thereof are omitted. In FIG. 11, in a case where the CPU 111 determines that the selected address type is the facsimile (the FAX 411) (YES in S1104), the CPU 111 advances the processing to S1105.

In S1105, the CPU 111 determines whether the address to be left in the FAX transmission history is set to the CSI. In a case where the CPU 111 determines that the address to be left in the FAX transmission history is set to the CSI (YES in S1105), the CPU 111 advances the processing to S1106. Processing in S1106 is the same as the processing in S905 in FIG. 9, and thus the description thereof is omitted. In this case, registration of the facsimile address obtained from the CSI signal in the address book from the transmission history is prohibited.

On the other hand, in the above-described S1105, in a case where the CPU 111 determines that the address to be left in the FAX transmission history is not set to the CSI (NO in S1105), the CPU 111 advances the processing to S1107. Processing in S1107 is the same as the processing in S906 in FIG. 9, and thus the description thereof is omitted. In this case, the registration of the address in the address book from the transmission history is not prohibited.

As described above, according to the second exemplary embodiment, when the address to be left in the FAX transmission history is set to the CSI, the registration of the facsimile number in the address book from the transmission history is prohibited in addition to the configuration according to the first exemplary embodiment. More specifically, it is configured not to display the transmission history button on the address book registration screen and the address book button on the facsimile transmission history screen. On the other hand, when the address to be left in the FAX transmission history is not set to the CSI, the registration of the facsimile number in the address book from the transmission history is not prohibited. More specifically, it is configured to display the transmission history button on the address book registration screen and the address book button on the facsimile transmission history screen. Accordingly, registration in the address book from the transmission history, which may lead to erroneous transmission, is more surely prevented, and other address book registration and editing are enabled, so that erroneous transmission can be prevented without impairing convenience.

The present disclosure describes the above exemplary embodiments; however, the claims are not limited to these exemplary embodiments, and various other embodiments may be included in the claims.

According to some of the present exemplary embodiments, the button is hidden to prevent the registration from the transmission history, however, another method may be used as long as registration in the address hook can be prevented (prohibited). For example, the button may be put in an unselectable (e.g., inoperable) state (e.g., displayed in a grayout state). In addition, a configuration may be adopted which displays a button for performing registration from the transmission history, displays a warning indicating that a function of the button cannot be used when the button is pressed, and performs control to prohibit the registration.

In addition, the MFP 101 can shift from the FAX button 302 on the home screen 308 to the facsimile transmission screen. In the case that the facsimile transmission screen is displayed, the CPU 111 may determine whether the address book registration from the transmission history is prohibited and perform control not to display the transmission history button on the facsimile transmission screen in a case where the CPU 111 determines that the registration is prohibited. Further, the CPU 111 may determine whether an address to be left in the transmission history is set to the CSI as with the second exemplary embodiment and perform control not to display the transmission history button on the facsimile transmission screen in a case where the CPU 111 determines that the address is set to the CSI.

Further, an address setting button (a button for selecting a history and setting an address to the facsimile transmission screen) may be disposed on the detail information screen 810 of the history. In this case, when the detail information screen 810 of the history is displayed in the processing in S905 in FIG. 9 (or in S1106 in FIG. 11), the CPU 111 performs control to display the detail information screen 810 of the history in which the address setting button is hidden (an unusable mode). According to the configuration, facsimile transmission by selecting an address from the transmission history which may lead to erroneous transmission is prohibited while enabling address selection from the other histories, and erroneous transmission can be prevented without impairing convenience.

As described above, each of the exemplary embodiments is configured to be provided with a setting (501 in FIG. 5) for prohibiting registration of a facsimile address of a transmission history in an address book, to hide a button tier registering from the transmission history in the address book according to the setting, and thus to prevent registration of a wrong address. Accordingly, only registration in the address book from the transmission history which may lead to erroneous transmission is prevented, and other address book registration and editing are enabled (not prohibited), so that erroneous transmission can be prevented without impairing convenience.

Configurations and contents of the above-described various data pieces are not limited to them, and the data pieces may include various configurations and contents according to applications and purposes.

Some embodiments may include, for example, a system, an apparatus, a method, a program, and a storage medium. For example, some embodiments may include a system constituted of a plurality of devices or an apparatus constituted of a single device.

Further, some embodiments include configurations as combinations of each of the above-described exemplary embodiments.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that the claims are not limited to the disclosed exemplary embodiments. The scope of the following claims is to be accorded the broadest interpretation so as to encompass all such modifications and equivalent structures and functions.

This application claims priority to Japanese Patent Application No. 2017-184747, which was filed on Sep. 26, 2017 and which is hereby incorporated by reference herein in its entirety.

What is claimed is:

1. An image processing apparatus capable of performing a plurality of transmission functions including a facsimile transmission function, the image processing apparatus comprising:
a storage that stores a history of transmission functions in a case where the transmission functions are performed, the history of the transmission functions including destination information, wherein, in a case where the facsimile transmission function is performed, the destination information is a telephone number indicated by a called subscriber identification (CSI) signal received from a transmission destination; and
a controller that registers, in an address book, the destination information included in the history according to a user instruction,
wherein the controller performs a setting whether or not to permit registration of destination information of the facsimile transmission function read out from the history in the address book,
wherein, in a case where it is set that the registration is permitted, the controller permits the registration of the destination information of the facsimile transmission function, and permits registration of destination information of a transmission function which is different from the facsimile transmission function,
wherein, in a case where it is set that the registration is not permitted, the controller does not permit the registration of the destination information of the facsimile transmission function, and permits the registration of the destination information of the transmission function which is different from the facsimile transmission function, and
wherein the controller causes the image processing apparatus to perform the facsimile transmission function in a case where it is set that the registration is not permitted.

2. The image processing apparatus according to claim 1, wherein the controller performs setting whether or not to permit registration of a telephone number indicated by the CSI signal in the history,
wherein, in a case where it is set that the registration of the destination information of the facsimile transmission function is not permitted, and it is set that the registration of the telephone number indicated by the CSI signal is not permitted, the controller registers, in the address book, the telephone number which is included in the history.

3. The image processing apparatus according to claim 1, further comprising:
a display,
wherein the controller displays a screen which includes a button for receiving a user instruction in the display, and
wherein in a case where it is set that the registration of the destination information of the facsimile transmission function is not permitted, the controller does not display the button in the display.

4. The image processing apparatus according to claim 3, wherein in a case where the controller receives a selection of a history of the facsimile transmission function by a user, the controller displays a screen which does not include the button in the display.

5. A method for controlling an image processing apparatus capable of performing a plurality of transmission functions including a facsimile transmission function, the method comprising:
storing a history of the transmission functions in a case where the transmission functions are performed, the history of the transmission functions including destination information, wherein, in a case where the facsimile transmission function is performed, the destination information is a telephone number indicated by a called subscriber identification (CSI) signal received from a transmission destination;

registering, in an address book, the destination information included in the history according to a user instruction;

performing a setting whether or not to permit registration of destination information of the facsimile transmission function read out from the history in the address book, wherein, in a case where it is set that the registration is permitted, the registration of the destination information of the facsimile transmission function is permitted, and registration of destination information of a transmission function which is different from the facsimile transmission function is permitted, and wherein, in a case where it is set that the registration is not permitted, the registration of the destination information of the facsimile transmission function is not permitted, and the registration of the destination information of the transmission function which is different from the facsimile transmission function is permitted; and performing the facsimile transmission function in a case where it is set that the registration is not permitted.

6. The method according to claim 5, further comprising:

performing a setting whether or not to permit registration of a telephone number indicated by the CSI signal in the history, wherein, in a case where it is set that the registration of the destination information of the facsimile transmission function is not permitted, and it is set that the registration of the telephone number indicated by the CSI signal is not permitted, the telephone number which is included in the history is registered in the address book.

7. The method according to claim 5, further comprising:

displaying a screen, wherein the screen includes a button for receiving a user instruction, and wherein in a case where it is set that the registration of the destination information of the facsimile transmission function is not permitted, the button is not displayed.

8. The method according to claim 7, wherein in a case where a selection of a history of the facsimile transmission function by a user is received, a screen which does not include the button is displayed.

9. A non-transitory computer-readable storage medium storing a program for causing a computer to execute a method for controlling an image processing apparatus capable of performing a plurality of transmission functions including a facsimile transmission function, the method comprising:

storing a history of the transmission functions in a case where the transmission functions are performed, the history of the transmission functions including destination information, wherein, in a case where the facsimile transmission function is performed, the destination information is a telephone number indicated by a called subscriber identification (CSI) signal received from a transmission destination;

registering, in an address book, the destination information included in the history according to a user instruction;

performing a setting whether or not to permit registration of destination information of the facsimile transmission function read out from the history in the address book, wherein, in a case where it is set that the registration is permitted, the registration of the destination information of the facsimile transmission function is permitted, and registration of destination information of a transmission function which is different from the facsimile transmission function is permitted, and wherein, in a case where it is set that the registration is not permitted, the registration of the destination information of the facsimile transmission function is not permitted, and the registration of the destination information of the transmission function which is different from the facsimile transmission function is permitted; and performing the facsimile transmission function in a case where it is set that the registration is not permitted.

* * * * *